Sept. 10, 1963 D. C. LANTZ, JR 3,103,426
APPARATUS FOR CONDENSATION AND FLASHBACK PREVENTION
FOR CARBONIZING AND/OR DESTRUCTIVE
DISTILLATION OPERATIONS
Filed June 21, 1961 5 Sheets-Sheet 1
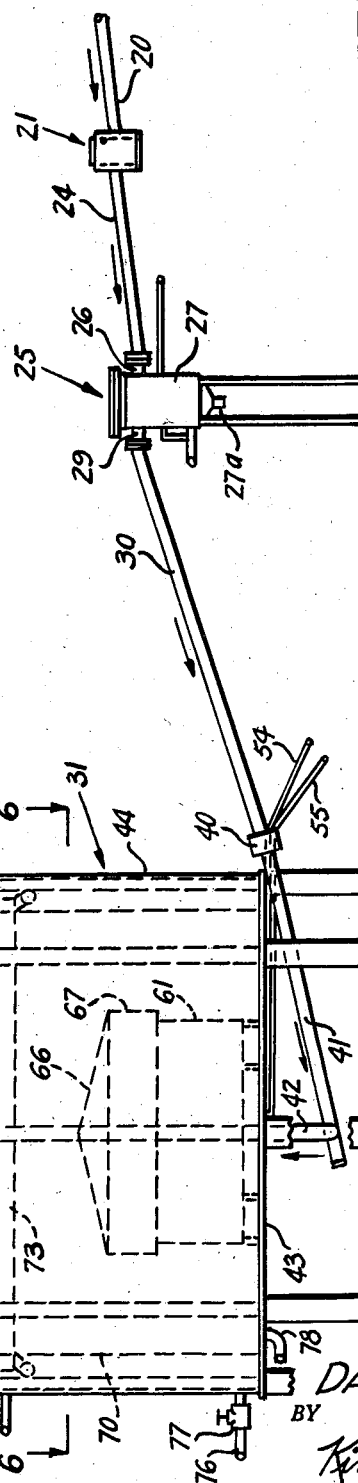
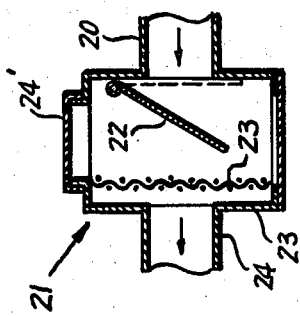
INVENTOR.
DAE C. LANTZ, JR.
BY
Kimmel & Crowell
ATTORNEYS.

Sept. 10, 1963 D. C. LANTZ, JR 3,103,426
APPARATUS FOR CONDENSATION AND FLASHBACK PREVENTION
FOR CARBONIZING AND/OR DESTRUCTIVE
DISTILLATION OPERATIONS
Filed June 21, 1961 5 Sheets-Sheet 2
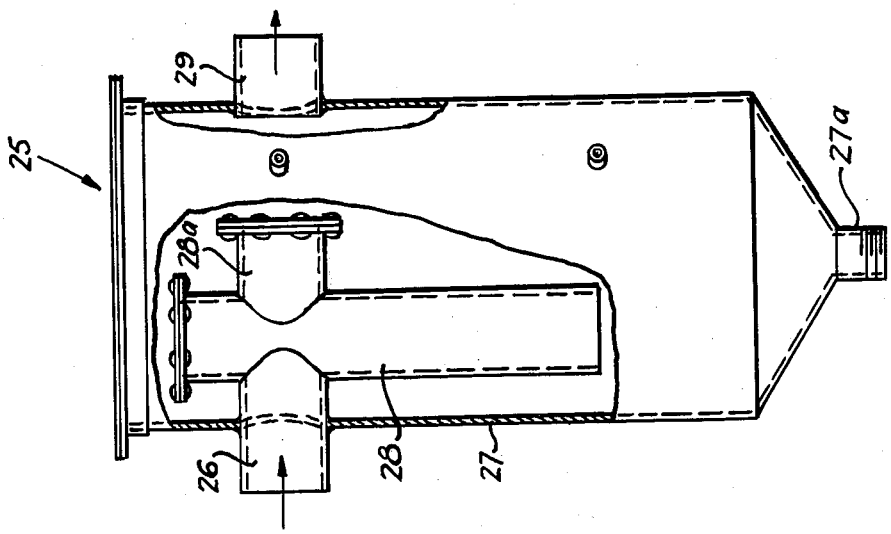
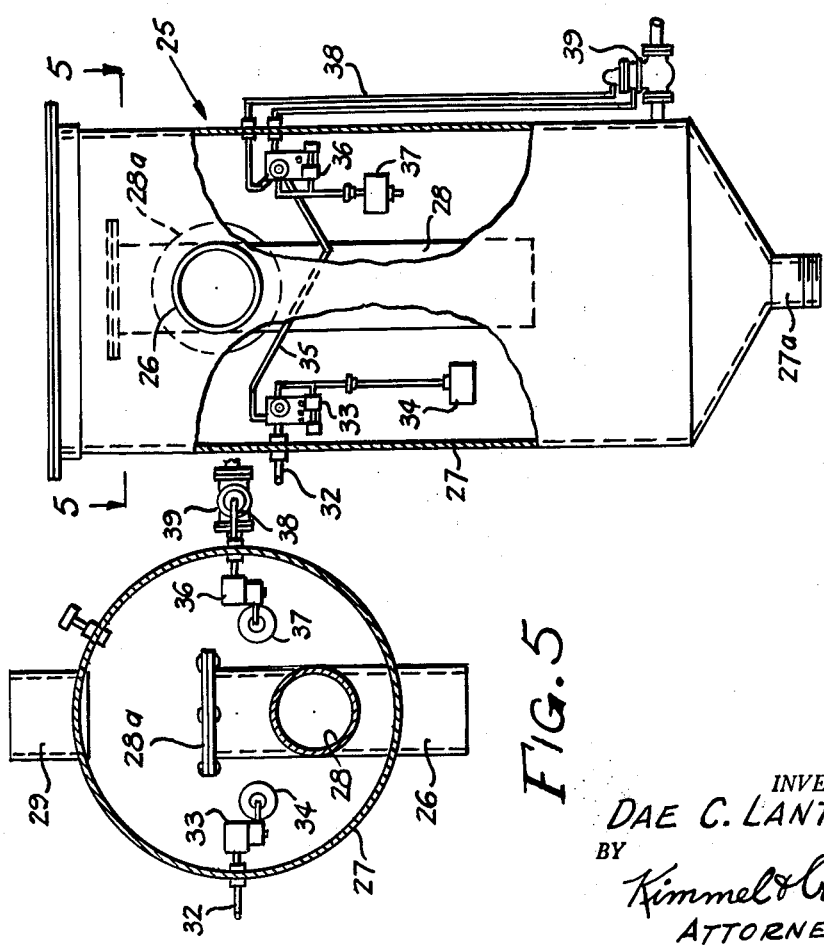
INVENTOR.
DAE C. LANTZ, JR.
BY
Kimmel & Crowell
ATTORNEYS.

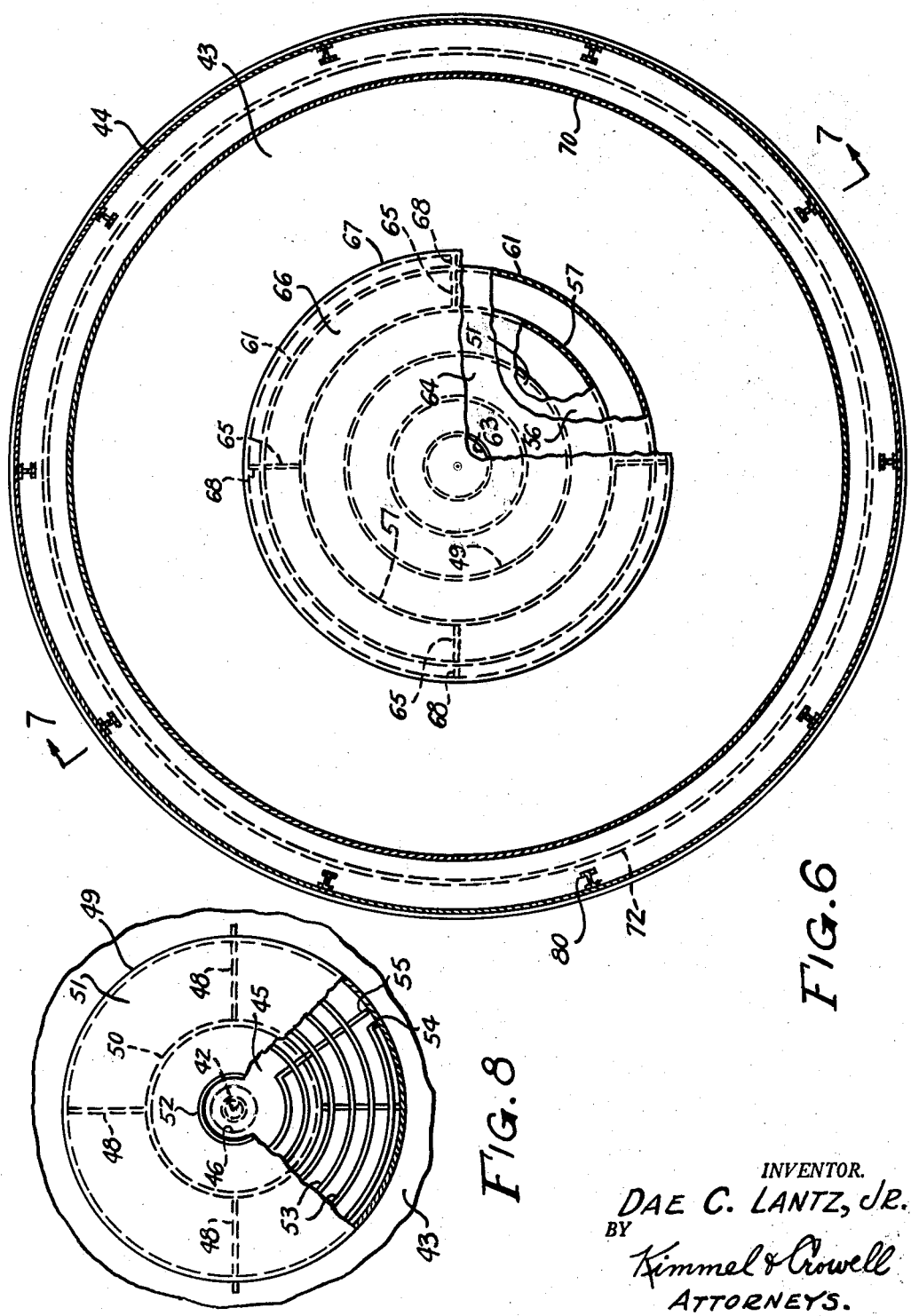

INVENTOR.
DAE C. LANTZ, JR.
BY
Kimmel & Crowell
ATTORNEYS.

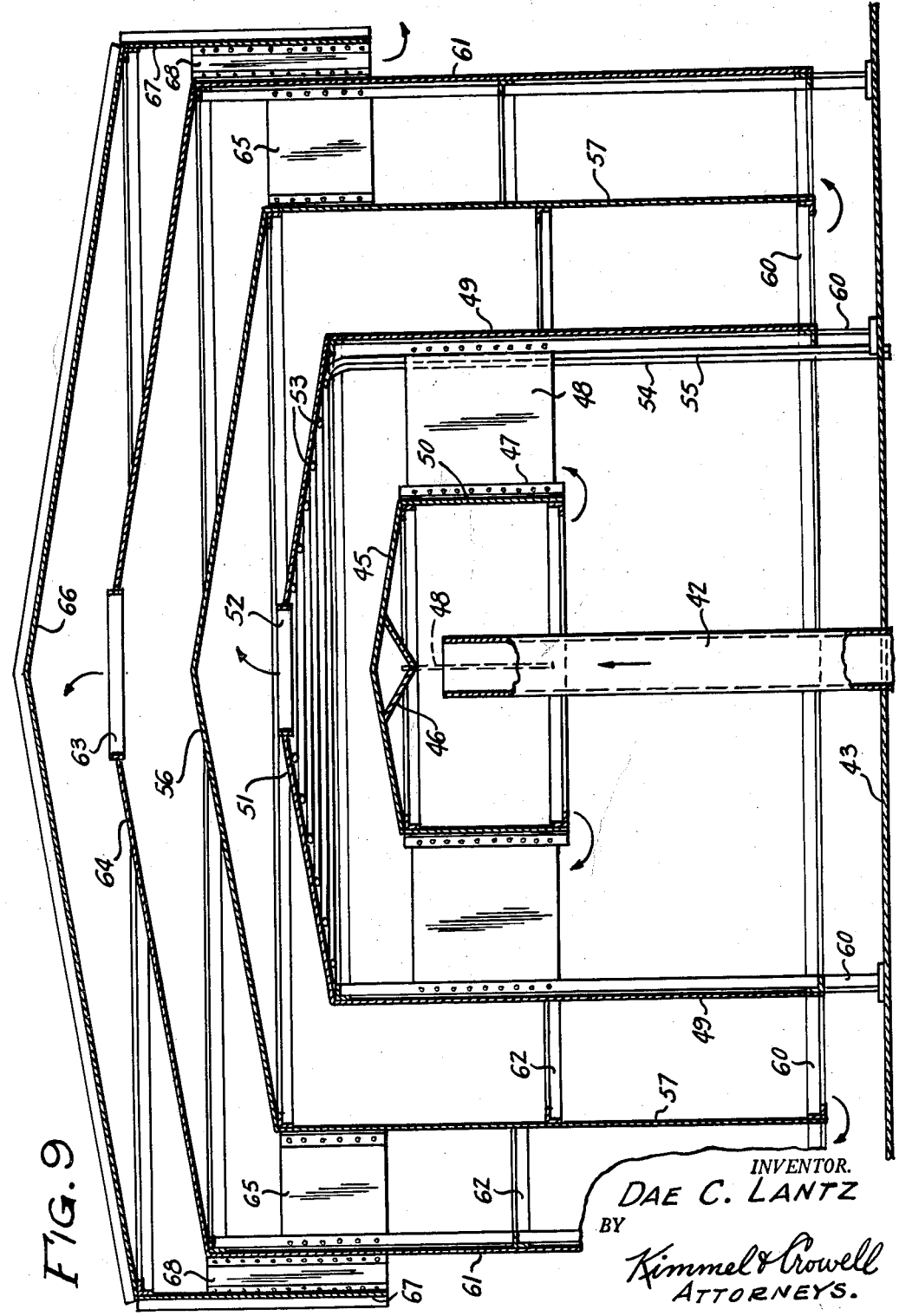

3,103,426
APPARATUS FOR CONDENSATION AND FLASH-BACK PREVENTION FOR CARBONIZING AND/OR DESTRUCTIVE DISTILLATION OPERATIONS
Dae C. Lantz, Jr., Glendale, Calif., assignor to Pan American Resources, Inc., Burbank, Calif.
Filed June 21, 1961, Ser. No. 118,687
5 Claims. (Cl. 55—222)

This invention relates to an apparatus for condensation of the raw vapors resulting from carbonizing or destructive distillation operations as well as an apparatus for preventing flashback of sparks from the raw vapors.

A primary object of the invention is the provision of an improved apparatus for separating dry gases from creosote tars in order that such gases may be routed back to a retorting system or carbonizing unit to be used as fuel or for operating other gas equipment for heat, light, power, refrigeration or the like.

An additional object of the invention is the provision of an improved flash-back preventative apparatus.

A more specific object of the invention resides in the provision of an improved condensation unit wherein condensation is effected by cooling coils and the separation completed by routing the vapors into selected drop areas to induce final precipitation of water particles in creosote tar residues from the gas to be dried.

A more specific object of the invention resides in the provision of an improved separating apparatus comprising a primary baffle cone condenser section and a secondary precipitation section.

A further specific object of the invention is the provision of an improved water trap and flashback screen.

Still another object of the invention resides in the combinations of elements, arrangements of parts, and features of construction, as well as the sequence of operation.

Other objects will in part be obvious and in part be pointed out as the description of the invention proceeds and shown in the accompanying drawings wherein there is disclosed a preferred form of apparatus for carrying out the method comprising an element of the instant invention.

In the drawings:

FIGURE 1 is a side elevational view of one form of apparatus constructed in accordance with the instant invention.

FIGURE 2 is an enlarged fragmentary vertical sectional view showing the flash-back preventative screen as illustrated in FIG. 1.

FIGURE 3 is an enlarged side view partially in elevation and partially in section, parts thereof being broken away, showing the water trap comprising a component of the instant apparatus.

FIGURE 4 is a view similar to FIG. 3 but taken at right angles thereto.

FIGURE 5 is a sectional view taken substantially along the line 5—5 of FIG. 3 as viewed in the direction indicated by the arrows.

FIGURE 6 is an enlarged sectional view taken substantially along the line 6—6 of FIG. 1 as viewed in the direction indicated by the arrows, parts thereof being broken away.

FIGURE 8 is a fragmentary top plan view, partially broken away, and partially in section, taken substantially along the line 8—8 of FIG. 7; and FIGURE 9 is an enlarged detail vertical sectional view showing the primary section of the condensing apparatus as illustrated in FIG. 7.

Similar reference characters refer to similar parts throughout the several views of the drawing.

Figure 7:
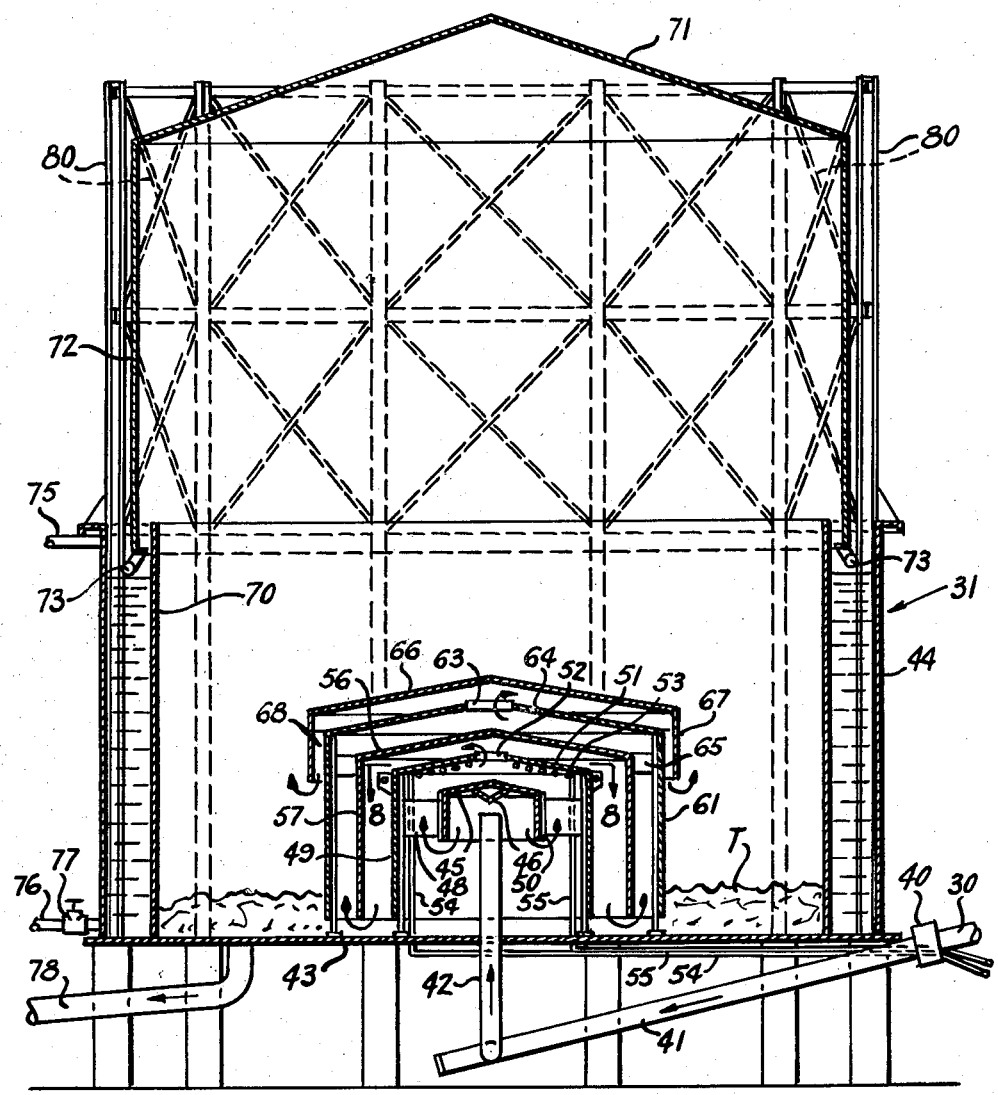
FIGURE 7 is a sectional view taken substantially along the line 7—7 of FIG. 6 as viewed in the direction indicated by the arrows.

Having reference now to the drawings in detail, and more particularly to FIG. 1, there is shown at 20 an inlet pipe through which pass raw vapors from a refuse converter or the like for carbonizing or destructive distillation operations. Such a converter may take the form of that shown in my co-pending application, Serial No. 803,298, entitled "Refuse Converter," filed March 31, 1959, now U.S. Patent No. 2,993,843. The raw gases passing through the pipe 20 are hot, and carry live sparks. The first step in the process of the instant invention consists in passing such gases through a spark arrester generally indicated at 21, which is provided with an interiorly positioned flap valve 22, as best shown in FIG. 2, and a spark arresting screen 23. A cleaning vent 24 is provided on the spark arrester, and the gases after passing through the screen 23 pass, in the direction indicated by the arrows in FIG. 1, into a line 24 from which they are conveyed to a water trap 25 through an inlet pipe 26. The water trap 25 is shown in detail in FIGS. 3 to 5, and includes the inlet pipe 26 which passes into a receptacle 27. Inlet pipe 26 is provided with a depending portion 28 which extends below the water line of the water trap receptacle, and has an opposite header section 28a. The raw gases pass through the depending pipe section 28 downwardly below the water level indicated at W, and thence through an outlet 29 into a pipe 30 from whence they are conveyed to the condenser or separator generally indicated at 31 and to be described more fully hereinafter.

The water trap flash-back preventer also constitutes a fresh water scrubber and includes a water inlet 32 connected to the city water line and a low level float valve 33 of conventional construction, which is actuated by a float 34. Copper tubing 35 connects the low level float valve with a high level float valve generally indicated at 36 which is actuated by a float 37 and which is connected through suitable copper tubing 38 with a conventional drain valve 39 which opens on the rising of the float to control the water level between the selected heights. As the gases enter through the pipe 28, they are passed through the water in the receptacle 27 and thoroughly scrubbed, the water also serving to quench any remaining sparks to positively prevent any flashback from sparks which may have penetrated the screen 23.

The scrubbed and moistened gases then pass through the outlet 29 and the pipe 30 into the separator unit 31 through a union 40 with the pipe 41 which extends to a vertical riser 42 which passes through a suitable opening in the bottom 43 of a tank 44. Riser 42 terminates below a hood 45 which has a centrally positioned downwardly projecting baffle 46, as best shown in FIGS. 7 and 9. The hood 45 is supported by an annulus 47 which is connected by straps 48 to a shell 49 which rests on the bottom 43 of the tank 44 and the raw vapors pass in the direction indicated by the arrows in FIGS. 7 and 9 upwardly around the rim 50 of baffle 45 to the top 51 of shell 49 and thence outwardly through a central opening 52 therein. A copper cooling coil 53 surrounds the underside of the top 51 and is supplied with fluid through the lines 54 and 55 which extend outwardly to a suitable source of water as indicated in FIGS. 1 and 7 providing a continuous circulation of a cooling medium through the coil.

Gases passing through the opening 52 impinge on the top 56 of an intermediate shell 57, which is spaced upwardly from the bottom 43 of the tank to permit the passage of gases therearound as indicated by arrows in FIGS. 7 and 9, being supported on suitable channel irons 60 or the like. Shell 57 is surrounded by an outer shell 61 suitably supported by angle irons 62, the shell 61 having an opening 63 in its top 64. Spacers and supporting flanges 65 also serve to support the shell 61. After the gases pass through the opening 63 they impinge against the top 66 of an outer baffle 67 which is supported by spacers 68 and thence downwardly as best shown in FIG. 7. Here the gases escape into an inner tank 70, which is positioned within the tank 44, the space between the outer wall of the tank 70 and the tank 44 being filled with water. A tank top 71 is supported by an annular flange 72 and floats 73 in the water between the tank wall 70 and 44, and is supported for vertical movement by a conventional frame 80. An overflow pipe 75 is provided and the water inlet 76 is controlled by a valve 77. The bottom of the tank is provided with a creosote tar drain 78 as best shown in FIGS. 1 and 7.

From the foregoing the method of use and operation of the device should now be readily understandable.

Vapors from the separator pass through line 20 through the back pressure valve 22 and the flash-back screen 23 which prevents the carrying forward of sparks. From here the vapors pass through the line 24 into the water trap 25 which further prevents sparks from continuing live and also prevents combustible gases from being back pressured to the point of origin or the heat area. As the vapors pass through the water in tank or receptacle 27, they are again submerged in creosote tars which collect in the bottom of the receptacle 27, there being also provided a creosote tar outlet 27a at the bottom of the tank. This is a further safeguard against sparks or flash from the heat area and against combustible or dry gases being back pressured to the heat area. The vapors pass out after the water scrubbing process from the water trap 25 through the line 30, and thence into the primary section of the separator, or under the hood 45. They are discharged upwardly onto the cone deflector or baffle 46 from which they are deflected onto the cylinder walls 49, and thence passed upwardly through the cooling coils, through which coolant is circulated by means of the pipes 54 and 55. These coils further speed up condensation and discharge the remaining vapors through the outlet 52 to impinge on the top 56 of the section 57. The vapors then pass below partitions 49 and 57, or the submersion section of the apparatus and travel downward through the creosote tars (creosote, tars and water, indicated in FIG. 7 by the line T) before rising again into the outlet section, leaving such condensates as are released into the creosote tars. The vapors remaining after passing out of this submersion section travel upward into and out of a release section through the hood outlet 63 leaving additional concentrates and thence passing into the drying section formed by the hood 66—67. They circulate in this hood-like section, dropping additional condensates, if any, as they are forced downward before being released into the gas section of a holder tank defined by the wall 70. This gas section of the holder tank is surrounded by the water jacket area between the wall 70 and the outer wall of the tank 44 through which cold water is circulated, thus effecting the final condensation and releasing the remaining condensate from the combustible gases.

After this step the dry gases are then released through a suitable gas outlet and routed back to the retorting system or carbonizing unit or destructive distillation section to be used as fuel for continuing the operation of the converter system, or for operating other gas equipment for heat, light, power, refrigeration, or similar purposes.

From the foregoing it will now be seen that there is herein provided an improved flash-back preventative system and an apparatus which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. Apparatus for condensing and drying gases from destructive distillation apparatus comprising an inlet pipe extending to a spark arrester, a water trap and scrubber, a pipe connection from said arrester to said trap, a condenser, a pipe leading from said trap to said condenser, said condenser including a bottom through which said last-mentioned pipe extends, a depending conical baffle overlying said last-mentioned pipe, an annular skirt on said baffle, a shield having a skirt depending to a point adjacent said bottom but spaced therefrom and surrounding said baffle, said shield having a top with an opening therein, a cooling coil surrounding said opening, a second shield having a top overlying said opening, and a skirt spaced from the bottom of said condenser, a third shield having a conical top with an opening at its apex surrounding said second shield, said third shield having a skirt depending to a point adjacent said bottom but spaced therefrom, a hood having a closed conical top and a short depending skirt surrounding and overlying said third shield, an expansion tank surrounding said last-mentioned shield, and a gas outlet in said expansion tank, said expansion tank having two spaced peripheral walls, and means for circulating cooling water between said walls.

2. The structure of claim 1 wherein said spark arrester comprises a receptacle having a back pressure valve and a flash back screen therein.

3. The structure of claim 1 wherein said water trap and scrubber comprises a receptacle containing water, a depending inlet extending below the water level in said receptacle, and an outlet above the water level.

4. The structure of claim 3 wherein high and low level float valves are contained in said receptacle and a creosote tar outlet is provided in the bottom of said receptacle, said low level float valve including means for maintaining the water level in said receptacle above said inlet, and said high level float valve including means for maintaining the water level in said receptacle below said outlet.

5. The structure of claim 1 wherein the bottom of the condenser is provided with a creosote tar outlet.

References Cited in the file of this patent

UNITED STATES PATENTS

| 636,256 | Gates | Nov. 7, 1899 |
| 1,294,551 | Smethurst | Feb. 18, 1919 |
| 1,542,234 | Golden | June 16, 1925 |
| 1,575,292 | Tyler | Mar. 2, 1926 |
| 1,877,296 | Goldberg | Sept. 13, 1932 |
| 1,943,311 | Hemenway | Jan. 16, 1934 |
| 2,612,745 | Vecchio | Oct. 7, 1952 |
| 2,818,135 | White | Dec. 31, 1957 |